(12) United States Patent
Ngai et al.

(10) Patent No.: US 6,188,730 B1
(45) Date of Patent: Feb. 13, 2001

(54) HIGHLY PROGRAMMABLE CHROMINANCE FILTER FOR 4:2:2 TO 4:2:0 CONVERSION DURING MPEG2 VIDEO ENCODING

(75) Inventors: Agnes Yee Ngai, Endwell; Michael Patrick Vachon, Johnson City, both of NY (US)

(73) Assignee: Internatonal Business Machines Corporation, Armonk, NY (US)

( * ) Notice: Under 35 U.S.C. 154(b), the term of this patent shall be extended for 0 days.

(21) Appl. No.: 09/046,286

(22) Filed: Mar. 23, 1998

(51) Int. Cl.$^7$ .................................................. H04N 07/18
(52) U.S. Cl. ................... 375/240.21; 348/441; 348/443; 348/453; 375/240
(58) Field of Search ................................. 348/441, 443, 348/444, 446, 448, 450, 453, 454, 392; 375/240.21

(56) References Cited

U.S. PATENT DOCUMENTS

| | | | |
|---|---|---|---|
| 5,412,428 | * 5/1995 | Tahara | 348/396 |
| 5,650,824 | * 7/1997 | Huang | 348/453 |
| 5,712,687 | * 1/1998 | Naveen et al. | 348/453 |
| 5,790,197 | * 8/1998 | Canfield | 348/453 |
| 5,844,617 | * 12/1998 | Faroudja et al. | 348/441 |
| 6,018,366 | * 1/2000 | Asai et al. | 348/394 |

* cited by examiner

*Primary Examiner*—Andy Rao
(74) *Attorney, Agent, or Firm*—Scully, Scott, Murphy & Presser; John R. Pivnichny

(57) ABSTRACT

A filter for downsampling input video having a first chrominance sampling to a second chrominance sampling. The input video has a Bitstream of data representing a sequence of picture frames, where each picture frame has a plurality of video lines. The filter has a means for choosing a downsampling mode from a list of available downsampling modes for the downsampling of the first chrominance sampling. The filter also has a means for dividing each picture frame into video line sets according to predetermined criteria for the particular downsampling mode chosen, where each video line set has at least two video lines. A means for assigning default downsampling coefficients for each of the video lines in the video line sets based upon the downsampling mode chosen is also provided in the filter. Lastly, the filter has a means for downsampling each video line set to a single video line having the second chrominance sampling. In a preferred embodiment, the first chrominance sampling is 4:2:2 and the second chrominance sampling is 4:2:0.

32 Claims, 3 Drawing Sheets

HIGHLY PROGRAMMABLE CHROMINANCE FILTER FOR 4:2:2 TO 4:2:0 CONVERSION DURING MPEG2 VIDEO ENCODING

BACKGROUND OF THE INVENTION

1. Field of the Invention

The field of art to which this invention relates is a chrominance filter for use with a digital video compression standard. Specifically, this invention relates to a highly programmable downsampling chrominance filter capable of filtering in more than one user selected mode.

2. Description of the Related Art

Within the past decade, the advent of world-wide electronic communications systems has enhanced the way in which people can send and receive information. In particular, the capabilities of real-time video and audio systems have greatly improved in recent years. In order to provide services such as video-on-demand, video conferencing, and multimedia communications to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and/or audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform (DCT), quantization, and variable length coding, all of which are well known in the art. Video compression between pictures is accomplished via a process referred to as motion estimation and compensation, in which a motion vector is used to describe the translation of a set of picture elements (pels) from one picture to another picture. Motion compensation takes advantage of the fact that video sequences are most often highly correlated in time, each frame in any given sequence may be similar to the preceding and following frames. These motion estimation and compensation techniques are also well known in the art.

To carry out the video compression, an encoder scans subsections within each frame, called macroblocks, and identifies which ones will not change position from one frame to the next. The encoder also identifies reference macro blocks while noting their position and direction of motion, and assigns a motion vector which identifies the motion of the reference block from one frame to another. Only the motion vector and difference data between each reference macro block and the affected current macro block is transmitted to the decoder. The decoder stores the information that does not change from frame to frame in its buffer memory and uses it to periodically fill in the macro blocks of the frame that do not change. The video sequence is subsequently decompressed and displayed close enough to the original video sequence to be acceptable for most viewing.

The MPEG-1 standard was introduced to handle the compressed digital representation of non-video sources of multimedia, and subsequently adapted for the transmission of video signals as long as the video material was first converted from interlaced to progressively scanned format. The MPEG-2 standard was developed to produce higher quality images at higher bit rates for moving images of various applications such as digital storage and communication, and supports both video material in interlaced or progressively scanned formats.

When performing MPEG2 video encoding, where the input video chrominance sampling is 4:2:2 and the desired output video chrominance sampling is 4:2:0, an effective chrominance downsampling method is desired. However, the preferable method by which the chrominance should be downsampled can vary according to several factors; including (1) the input video scanning format (e.g., interlaced or progressive) (2) the output video scanning format (e.g., interlaced or progressive), and (3) the input video material content.

A need therefore exists for a chrominance filter that can perform downsampling from 4:2:2 to 4:2:0 in several effective ways, the most effective of which, for a particular video source, particular input format and particular output format, can be selected by the user at the time of encoding.

SUMMARY OF THE INVENTION

Therefore, it is an object of the present invention to provide a downsampling chrominance filter for use with a video compression standard in which the way the downsampling is accomplished is selected by the user.

It is yet another object of the present invention to provide a downsampling chrominance filter capable of filtering in more than one user selected mode.

Accordingly, a method for downsampling input video having a first chrominance sampling to a second chrominance sampling is provided. The input video comprises a Bitstream of data representing a sequence of picture frames, where each picture frame comprises a plurality of video lines. The method comprises a first step of choosing a downsampling mode from a list of available downsampling modes for the downsampling of the first chrominance sampling. In a second step, each picture frame is divided into video line sets according to predetermined criteria for the particular downsampling mode chosen, where each video line set comprises at least two video lines. In a third step, default downsampling coefficients are assigned for each of the video lines in the video line sets based upon the downsampling mode chosen. Lastly, in a fourth step, each video line set is downsampled into a single video line having the second chrominance sampling according to equation (1);

$$L_0 = \{(C_1 * L_1) + (C_2 * L_2) + \ldots (C_n * L_n)\} \quad (1)$$

where $L_0$ is the downsampled output video line with the second chrominance sampling, C is the downsampling coefficient for line L, and where the subscripts denote the video line number of the video line set having a total of n video lines.

Also provided is a filter for downsampling input video having a first chrominance sampling to a second chrominance sampling. The input video comprises a Bitstream of data representing a sequence of picture frames, where each picture frame comprises a plurality of video lines. The filter comprises a means for choosing a downsampling mode from a list of available downsampling modes for the downsampling of the first chrominance sampling. The filter also comprises a means for dividing each picture frame into video line sets according to predetermined criteria for the particular downsampling mode chosen, where each video line set comprises at least two video lines. A means for assigning default downsampling coefficients for each of the video lines in the video line sets based upon the downsampling mode chosen is also provided in the filter. Lastly, the filter has a means for downsampling each video line set to a single video line having the second chrominance sampling according to equation (1).

In preferred embodiments of the methods of the present invention, the downsampled input video is compressed according to a video compression standard, such as MPEG-2.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Although this invention is applicable to numerous and various types of digital video compression standards, it has been found particularly useful in the environment of the MPEG-2 standard. Likewise, the present invention has been found particularly useful in downsampling a chrominance sampling of 4:2:2 to a chrominance sampling of 4:2:0. Therefore, without limiting the applicability of the invention to the MPEG-2 standard, or to downsampling from a 4:2:2 to a 4:2:0 chrominance sampling, the invention will be described in such environment.

Figure 1:
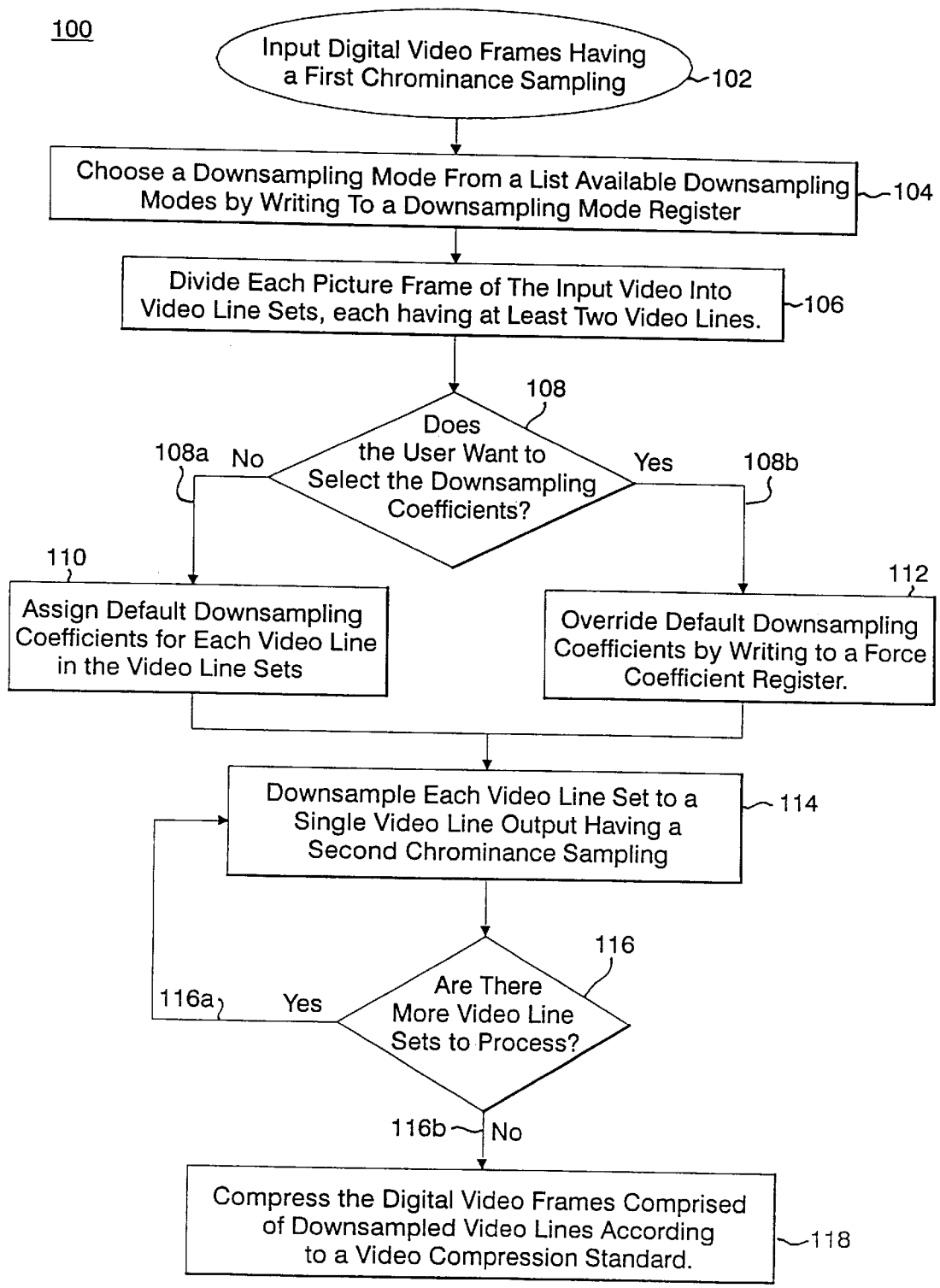
FIG. 1 illustrates a flow chart outlining the steps of the method of the present invention.

Referring to FIG. 1, there is illustrated a flowchart outlining the steps of the method of the present invention, referred to generally by reference numeral 100. A Bitstream of digital video is input into a downsampling filter at step 102. The input video comprises a sequence of picture frames, where each frame comprises a plurality of video lines. The input video is also of a certain scanning format, i.e., interlaced or progressive, and has a first chrominance sampling, such as 4:2:2. At step 104, a user of the filter chooses a downsampling mode from a list of available downsampling modes, preferably via a write of a corresponding value to a 2 bit downsampling mode register in the filter, prior to the start of the downsampling and subsequent video compression process. In the preferred embodiment of the present invention, four downsampling modes are available, each discussed in detail below. The four downsampling modes are; field conversion, frame conversion, output conversion, and drop field.

At step 106, each picture frame of the input video is divided into video line sets, each set having at least two lines. The specific lines that comprise each video line set (i.e., the location of the video lines in the original input picture frame) is determined by a video line selector processor, in which the decision is based upon the scanning format of the input video, the scanning format of the output downsampled video, and the filtering mode. A preferred way of selecting which video lines from the input video frame comprise the video line sets will be discussed below in detail for each preferred downsampling mode.

At step 108, a test is performed, by default the method 100 assigns default downsampling coefficients for each video line in the video line sets which are determined by the selected downsampling mode and by the input and output scanning formats. These coefficients are merely weighting factors and will be discussed in detail below with regard to the preferred available downsampling modes. However, the user has the choice of overriding the default downsampling values and forcing the downsampling coefficients to take on user selected values which will weigh the video lines in the video line sets according to the user's wishes.

If the user does not wish to override the default downsampling coefficients the method 100 proceeds along route 108a and the default downsampling coefficients are assigned to each line in the video line sets at step 110. If the user wants to override the default downsampling coefficients, the method 100 proceeds along route 108b, in which case the user selects the downsampling coefficients by a suitable means and those downsampling coefficients are assigned at step 112. Preferably, the user inputs the downsampling coefficient to method 100 by writing to a 3 bit force coefficient mode register. When no external input is received by the register from the user, the register is input with a predetermined input which signals the method 100 to use the default downsampling coefficients, preferably 000. When an input besides 000 is input into the force coefficient mode register by the user, the downsampling coefficients are forced to take on predetermined values based on the input. These values will be discussed below in detail with regard to the preferred available downsampling modes.

Regardless of whether the method proceeds along route 108a or 108b, the video line sets are individually downsampled at step 114 to a single line output having a second chrominance sampling, such as 4:2:0, according to equation (1) using the downsampling coefficients to weigh each line of the video line set. Preferably, each video line set comprises two video lines with their corresponding downsampling coefficients. The filter then operates on these two lines of input video at a time and outputs one resultant line of chrominance data. Each video line is preferably 8 pixels, or one chrominance block, in width. The two video lines and their corresponding downsampling coefficients configuration is chosen based on area, power, and memory bandwidth constraints, but could be upscaled to a larger number of video lines per video line set should the area, power, and memory constraints of the processor used to carry out the method.

The method 100 then downsamples each of the video line sets of the input video at steps 116 and route 116a as long as it is determined that more video line sets remain to be downsampled. When all video line sets of the input video have been downsampled, the method 100 proceeds along route 116b, at which point the downsampled input video is compressed at step 118 according to a video compression standard, such as MPEG-2. Alternatively, the downsampled video line sets can be compressed individually as they are downsampled.

Figure 2:
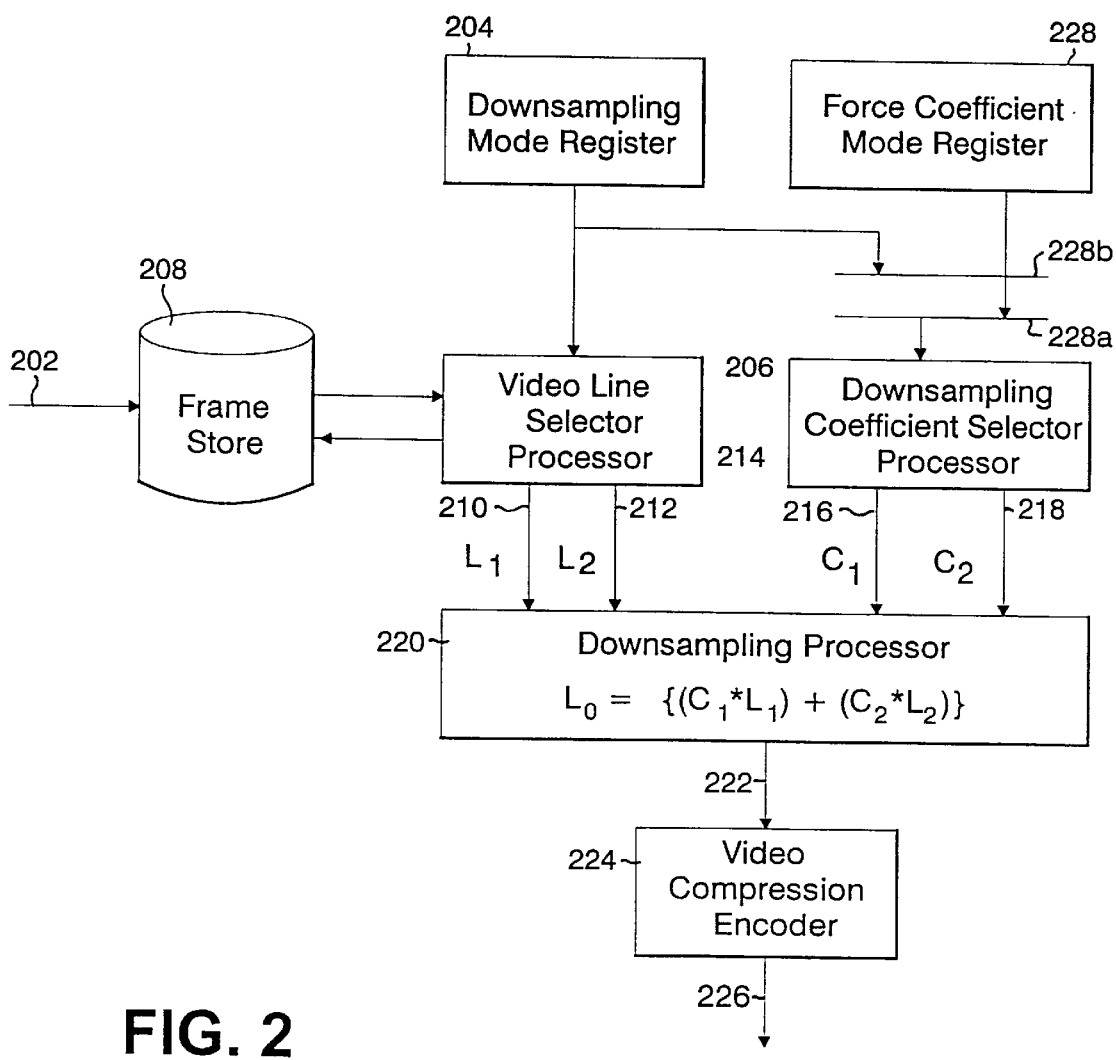
FIG. 2 illustrates the filter of the present invention.

Referring now to FIG. 2, therein is illustrated a filter, generally referred to by reference numeral 200, for downsampling input video 202 having a first chrominance sampling to a second chrominance sampling according to the method 100 of the present invention. Preferably, the first chrominance sampling is 4:2:2 and the second chrominance sampling is 4:2:0. The input video 202 comprises a Bitstream of data representing a sequence of picture frames, each picture frame comprising a plurality of video lines. The filter 200 comprises a means for choosing a downsampling mode from a list of available downsampling modes for the downsampling of the first chrominance sampling. Preferably the means for choosing a downsampling mode is accomplished by the user writing a value into a downsampling mode register 204 which corresponds to one of the available downsampling modes.

The filter also comprises a means for dividing each picture frame into video line sets according to predetermined criteria for the particular downsampling mode chosen. Each video line set comprises at least two video lines. Preferably the means for dividing each picture frame into video line sets comprises a frame store 208 working together with a video line selector processor 206. The number of video lines per video line set is preferably two. The video line selector processor 206 is capable of reading the value written into the downsampling mode register 204 and outputting the video lines selected for each video line set, referenced as 210 and 212 for the case where two video line sets are used.

Also provided is a means for assigning default downsampling coefficients for each of the video lines in the video line sets based upon the downsampling mode chosen. Preferably the means for assigning default downsampling coefficients is a downsampling coefficient selector processor 214 which can read the value written into the downsampling mode register 204 and output the default downsampling coefficients for the particular downsampling mode selected. The downsampling mode coefficients are referenced as 216 and 218 in the case where two video line sets are used. Lastly, a means for downsampling each video line set to a single video line having the second chrominance sampling 222 according to equation (1) is provided. In the case where two video line sets are used, equation (1) becomes;

$$L_0 = \{(C_1 * L_1) + (C_2 * L_2)\} \quad (2)$$

Preferably, the means for downsampling comprises a downsampling processor 220 which receives inputs 210, 212, 216, 218 and calculates the downsampled video line output 222.

The downsampled video line output 222 can then be input into a video compression encoder 224 for compression according to a video compression standard resulting in a compressed video output 226. Preferably, the video compression standard is MPEG-2.

In a variation of the filter 200, the assignment of the default downsampling coefficients can be overridden and the downsampling coefficients selected by the user. This is accomplished by a means for overriding the assignment of the default downsampling coefficients which is preferably a force coefficient mode register 228. The user writes a value to the force coefficient mode register 228 which the coefficient selector processor 214 recognizes and assigns coefficients accordingly.

The preferable available downsampling modes, their corresponding video line selection criteria and default downsampling coefficients, as well as the forcing coefficient mode are all discussed below in detail. However, it is understood to someone skilled in the art, that they are given by way of example only, and not to limit the scope of the present invention.

Figure 3:
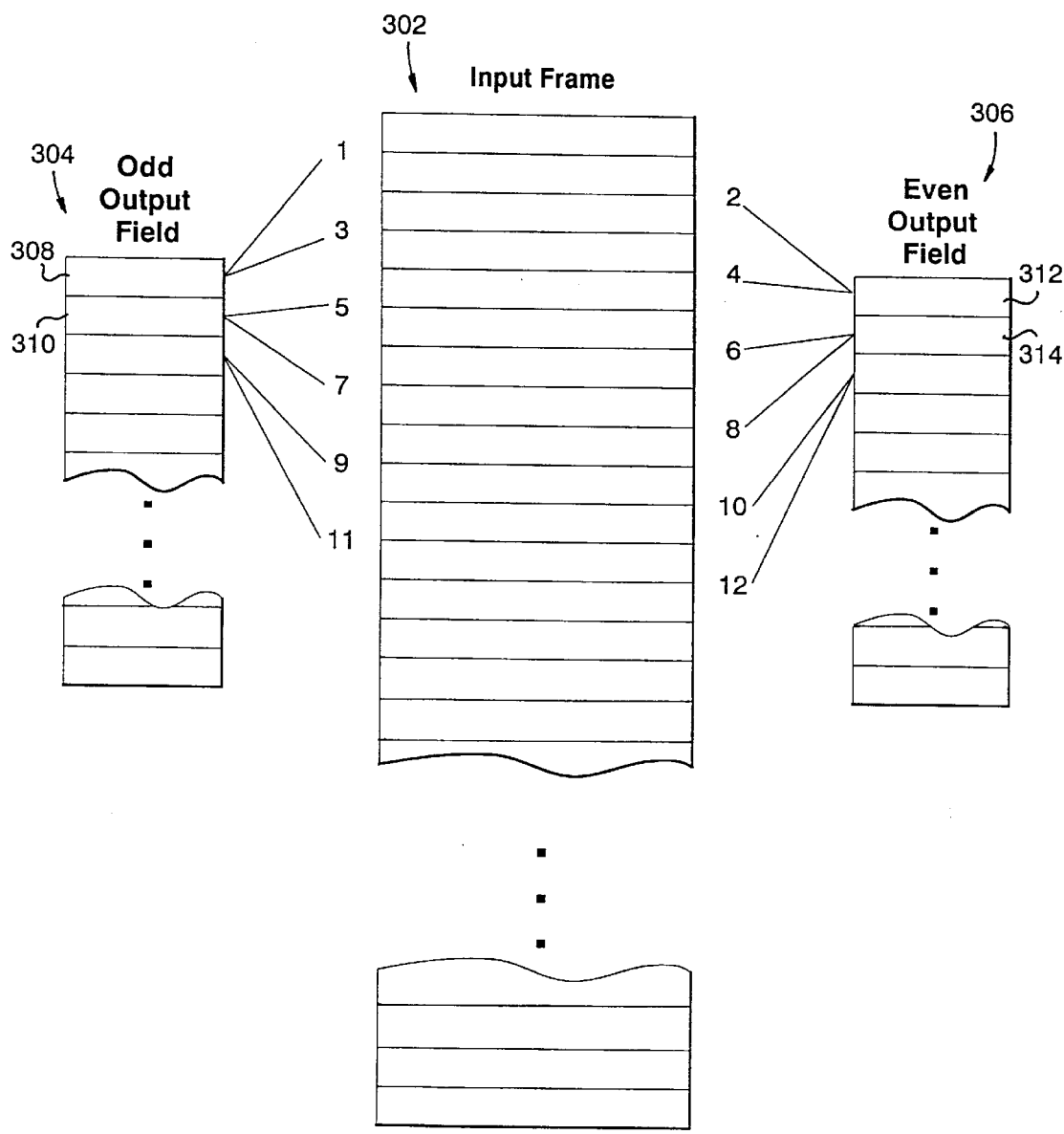
FIG. 3 illustrates an input video frame broken into odd and even output fields.

The preferable downsampling modes available for use with the present invention are defined as follows:

Field Conversion Downsampling Mode:

Referring now to FIG. 3, after dividing each input picture frame 302 into two fields, an odd field 304 and an even field 306, chrominance pixels in vertically adjacent video lines within each field are averaged together to create the output chrominance data. In the preferred video line selection for the field conversion mode, two video lines comprise each video line set. When the output scanning format is interlaced, the odd output field chrominance data is created by averaging video lines 1 and 3, lines 5 and 7, etc. Thus video line set 308 comprises video lines 1 and 3, video line set 310 comprises video lines 5 and 7, etc. Similarly, to create the even output field chrominance data, video lines 2 and 4 would be averaged, 6 and 8 would be averaged etc. Thus video line set 312 comprises video lines 2 and 4, video line set 314 comprises video lines 6 and 8, etc. This mode and output format is illustrated in FIG. 3. When the output scanning format is progressive, input video lines 1 and 3 are averaged to create output frame chrominance line 1, input frame lines 2 and 4 are averaged to create output frame chrominance line 2, etc.

In field conversion mode, the default downsampling coefficients when creating the odd field chrominance data where the output format is interlaced, or the odd lines of the output frame where the output format is progressive, are preferably ¾ for the data from the first line in each pair, and ¼ for the data from the second line in each. For the even field chrominance data where the output format is interlaced or the even lines of the output frame where the output mode is progressive, the coefficients are preferably ¼ for the data from the first line in each pair, and ¾ for the data from the second line in each pair.

Frame Conversion Downsampling Mode:

In frame conversion mode, again the input video frames are divided into two fields, an even field and an odd field, and preferably each video line set comprises two video lines. Chrominance pixels in vertically adjacent lines within an input picture frame are averaged together to create the output chrominance data. When the output format is interlaced, the odd output field chrominance data is created by averaging video lines 1 and 2, lines 5 and 6, etc. Thus, the first video line set from the odd field would comprise video lines 1 and 2, the second video line set comprises video lines 5 and 6, etc. Similarly, to create the even output field chrominance data, video lines 3 and 4 would be averaged, 7 and 8 would be averaged etc. Thus, the first video line set from the even field would comprise video lines 3 and 4, the second video line set comprises video lines 7 and 8, etc. When the output format is progressive, input video lines 1 and 2 are averaged to create output chrominance line 1, input video lines 3 and 4 are averaged to create output chrominance line 2, etc.

In frame conversion mode, the default downsampling coefficients for either video output format are preferably ½ for both the data from the first line in each pair as well as for the second line of each pair.

Output Conversion Downsampling Mode:

In output conversion mode, the filter operates (in terms of both video line selection and downsampling coefficient selection) in one of the two previously described modes, determined by the video output mode specified. When the output video format is interlaced, the filter operates in field conversion mode. When the output video format is progressive, the filter operates in frame conversion mode.

Drop Field Conversion Mode:

In drop field mode, the filter simply drops the chrominance data associated with the even input field, and uses the chrominance data from the odd input field exclusively. In other words, the downsampling coefficients are effectively 1.0 for the odd numbered frame lines, 0.0 for the even numbered frame lines.

Overriding Default Downsampling Coefficients

The force coefficient mode register shown in FIG. 2 is preferably comprised of two 3-bit regions, 228a, 228b. The first region contains bits 0:2 and the second bit region contains bits 3:5. When both regions are set to 0 (their default), the downsampling coefficients default to those values indicated in the previous downsampling mode descriptions. When either or both regions are set to a non-zero value, the default filter downsampling coefficients are overridden with alternate values.

The first 3 bit region dictates the even output field tap coefficients when the video output scanning format is interlaced, and is ignored when the video output scanning format is progressive.

The second 3 bit region of the force coefficient mode register dictates the odd output field downsampling coefficients when the video output scanning format is interlaced, and the frame downsampling coefficients when the output video scanning format is progressive.

Table 2 shows the layout of the force coefficient mode register, and table 3 shows the values that each downsampling coefficient will assume for each mode register setting.

TABLE 2

Force Coefficient Mode Register

| Bit Range | Interlaced Out Meaning | Progressive Out Meaning |
| --- | --- | --- |
| 0:2 | Force Even Field Tap Coefficients | Ignored |
| 3:5 | Force Odd Field Tap Coefficients | Force Frame Tap Coefficients |

TABLE 3

Coefficient Tap Values

| Mode Reg (0:2) | Mode Reg (3:5) | Odd Field Taps | Even Field Taps | Frame Taps |
| --- | --- | --- | --- | --- |
| 000 | — | default | default | default |
| 001 | — | default | line 1 = 1<br>line 2 = 0 | default |
| 010 | — | default | line 1 = 0<br>line 2 = 1 | default |
| 011 | — | default | line 1 = ½<br>line 2 = ½ | default |
| 100 | — | default | line 1 = ¾<br>line 2 = ¼ | default |
| 101 | — | default | line 1 = ¼<br>line 2 = ¾ | default |
| — | 000 | default | default | default |
| — | 001 | line 1 = 1<br>line 2 = 0 | default | line 1 = 1<br>line 2 = 0 |
| — | 010 | line 1 = 0<br>line 2 = 1 | default | line 1 = 0<br>line 2 = 1 |
| — | 011 | line 1 = ½<br>line 2 = ½ | default | line 1 = ½<br>line 2 = ½ |
| — | 100 | line 1 = ¾<br>line 2 = ¼ | default | line 1 = ¾<br>line 2 = ¼ |
| — | 101 | line 1 = ¼<br>line 2 = ¾ | default | line 1 = ¼<br>line 2 = ¾ |

It is evident from the method and filter of the present invention that a user of the filter is able to select from four filtering modes and numerous filter tap values to tune the filter to achieve optimal results, thus making for a highly programmable chrominance downsampling filter.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A method for downsampling input video having a first chrominance sampling to a second chrominance sampling, the input video comprising a Bitstream of data representing a sequence of picture frames, each picture frame comprising a plurality of video lines, the method comprising the steps of:

providing a programmable mode register defining a list of available downsampling modes;

inputting control data to the mode register to choose one of the downsampling modes from the list of available downsampling modes for the downsampling of the first chrominance sampling, dividing each picture frame into video line sets according to predetermined criteria for the particular downsampling mode chosen, each video line set comprising at least two video lines, assigning default downsampling coefficients for each of the video lines in the video line sets based upon the downsampling mode chosen, and downsampling each video line set to a single video line having the second chrominance sampling according to the following equation:

$$L_0 = \{(C_1 * L_1) + (C_2 * L_2) + \ldots (C_n * L_n)\}$$

where $L_0$ is the downsampled video line with the second chrominance sampling, C is the downsampling coefficient for line L, and where the subscripts denote the video line number of the video line set having a total of n video lines.

2. The method of claim 1, wherein the first chrominance sampling is 4:2:2 and the second chrominance sampling is 4:2:0.

3. The method of claim 2, wherein each video line set comprises two video lines.

4. The method of claim 3, wherein the downsampling mode chosen is based upon an input scanning format and material content of the input video, and on an output scanning format of the downsampled input video.

5. The method of claim 1, wherein the downsampling mode is chosen by writing to a downsampling mode register prior to the start of the downsampling.

6. The method of claim 3, wherein one of the downsampling modes available is a field mode in which the video line sets are further broken down into odd and an even output fields, wherein the odd output field comprises pairs of odd numbered video lines, starting at line one and following in odd numerical order, and wherein the even output field comprises pairs of even numbered video lines, starting at line two and following in even numerical order.

7. The method of claim 6, wherein the default downsampling coefficients are ¾ and ¼ for each of the first and second video lines, respectively, of the odd output fields, and ¼ and ¾ for each of the first and second video lines, respectively, of the even output fields.

8. The method of claim 3, wherein one of the downsampling modes available is a frame mode in which the video line sets are further broken down into odd and an even output fields, wherein the odd output field comprises every other pair of video lines, starting at lines one and two, and wherein the even output field comprises the remaining pairs of video lines, starting at lines three and four.

9. The method of claim 8, wherein the default downsampling coefficients are ½ and ½ for each of the first and second video lines, respectively, of the odd output fields, and ½ and ½ for each of the first and second video lines, respectively, of the even output fields.

10. The method of claim 6, wherein another one of the downsampling modes available is an output conversion mode in which field mode is chosen if the downsampled output video is to have an interlaced scanning format.

11. The method of claim 8, wherein another one of the downsampling modes available is an output conversion mode in which frame mode is chosen if the downsampled output video is to have a progressive scanning format.

12. The method of claim 3, wherein one of the downsampling modes available is a drop field mode in which the video line sets are further broken down into odd and an even output fields, wherein the odd output field comprises every other pair of video lines, starting at lines one and two, and wherein the even output field comprises the remaining pairs of video lines, starting at lines three and four, and in which the video lines of one of the odd or even output fields are assigned a downsampling coefficient of 1 and the video lines of the other field are assigned a downsampling coefficient of 0.

13. The method of claim 1, further comprising an optional step of overriding the assignment of the default downsampling coefficients by forcing the downsampling coefficients to take on user selected values.

14. The method of claim 13, wherein the optional step of overriding the assignment of the default downsampling coefficients is accomplished by writing to a force coefficient mode register in which the user selected values for the downsampling coefficients are selected.

15. The method of claim 1, further comprising the step of compressing the downsampled input video according to a video compression standard.

16. The method of claim 15, wherein the video compression standard is MPEG-2.

17. A filter for downsampling input video having a first chrominance sampling to a second chrominance sampling, the input video comprising a Bitstream of data representing a sequence of picture frames, each picture frame comprising a plurality of video lines, the filter comprising:

a programmable mode register defining a list of available downsampling modes;

means for transmitting control data to the mode register to choose one of the downsampling modes from the list of available downsampling modes for the downsampling of the first chrominance sampling, a means for dividing each picture frame into video line sets according to predetermined criteria for the particular downsampling mode chosen, each video line set comprising at least two video lines, a means for assigning default downsampling coefficients for each of the video lines in the video line sets based upon the downsampling mode chosen, and a means for downsampling each video line set to a single video line having the second chrominance sampling according to the following equation:

$$L_0 = \{(C_1 * L_1) + (C_2 * L_2) + \ldots (C_n * L_n)\}$$

where $L_0$ is the downsampled video line with the second chrominance sampling, C is the downsampling coefficient for line L, and where the subscripts denote the video line number of the video line set having a total of n video lines.

18. The filter of claim 17, wherein the first chrominance sampling is 4:2:2 and the second chrominance sampling is 4:2:0.

19. The filter of claim 18, wherein each video line set comprises two video lines.

20. The filter of claim 19, wherein the downsampling mode chosen is based upon an input scanning format and material content of the input video, and on an output scanning format of the downsampled input video.

21. The filter of claim 17, further comprising a downsampling mode register wherein the downsampling mode is chosen by writing to the downsampling mode register prior to the start of the downsampling.

22. The filter of claim 19, wherein one of the downsampling modes available is a field mode in which the video line sets are further broken down into odd and an even output fields, wherein the odd output field comprises pairs of odd numbered video lines, starting at line one and following in odd numerical order, and wherein the even output field comprises pairs of even numbered video lines, starting at line two and following in even numerical order.

23. The filter of claim 22, wherein the default downsampling coefficients are ¾ and ¼ for each of the first and second video lines, respectively, of the odd output fields, and ¼ and ¾ for each of the first and second video lines, respectively, of the even output fields.

24. The filter of claim 19, wherein one of the downsampling modes available is a frame mode in which the video line sets are further broken down into odd and even output fields, wherein the odd output field comprises every other pair of video lines, starting at lines one and two, and wherein the even output field comprises the remaining pairs of video lines, starting at lines three and four.

25. The filter of claim 24, wherein the default downsampling coefficients are ½ and ½ for each of the first and second video lines, respectively, of the odd output fields, and ½ and ½ for each of the first and second video lines, respectively, of the even output fields.

26. The filter of claim 22, wherein another one of the downsampling modes available is an output conversion mode in which field mode is chosen if the downsampled output video is to have an interlaced scanning format.

27. The filter of claim 24, wherein another one of the downsampling modes available is an output conversion mode in which frame mode is chosen if the downsampled output video is to have a progressive scanning format.

28. The filter of claim 19, wherein one of the downsampling modes available is a drop field mode in which the video line sets are further broken down into odd and an even output fields, wherein the odd output field comprises every other pair of video lines, starting at lines one and two, and wherein the even output field comprises the remaining pairs of video lines, starting at lines three and four, and in which the video lines of one of the odd or even output fields are assigned a downsampling coefficient of 1 and the video lines of the other field are assigned a downsampling coefficient of 0.

29. The filter of claim 17, further comprising a means for overriding the assignment of the default downsampling coefficients by forcing the downsampling coefficients to take on user selected values.

30. The filter of claim 17, further comprising a force coefficient mode register, wherein the means for overriding the assignment of the default downsampling coefficients is accomplished by writing to the force coefficient mode register in which the user selected values for the downsampling coefficients are selected.

31. The filter of claim 17, further comprising a means for compressing the downsampled input video according to a video compression standard.

32. The method of claim 31, wherein the means for compressing the downsampled input video is a MPEG-2 encoder.

* * * * *